Figure 1:
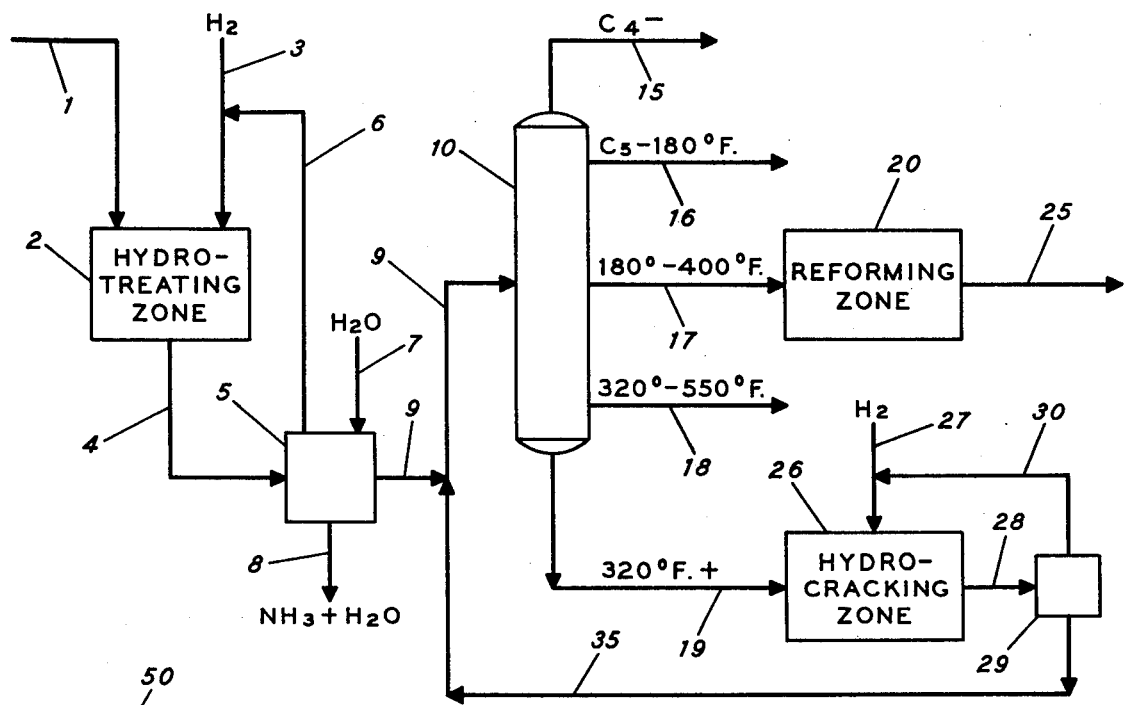

United States Patent [19]
White

[11] 3,983,029
[45] Sept. 28, 1976

[54] HYDROTREATING CATALYST AND PROCESS

[75] Inventor: Robert J. White, Pinole, Calif.

[73] Assignee: Chevron Research Company, San Francisco, Calif.

[22] Filed: Nov. 24, 1975

[21] Appl. No.: 634,993

Related U.S. Application Data

[60] Division of Ser. No. 337,518, March 2, 1973, Pat. No. 3,954,671, and a continuation-in-part of Ser. No. 27,068, April 9, 1970, abandoned.

[52] U.S. Cl. .................................. 208/59; 208/111; 208/254 H; 208/264; 252/455 Z
[51] Int. Cl.² .................. C10G 13/02; C10G 23/02; B01J 27/04
[58] Field of Search ............................. 208/111, 59

[56] References Cited
UNITED STATES PATENTS

| | | | |
|---|---|---|---|
| 3,459,680 | 8/1969 | Plank et al. ..................... | 252/455 Z |
| 3,598,719 | 8/1971 | White ................................... | 208/59 |
| 3,669,873 | 6/1972 | Jaffe et al. ............................ | 208/59 |

*Primary Examiner*—Delbert E. Gantz
*Assistant Examiner*—G. E. Schmitkons
*Attorney, Agent, or Firm*—G. F. Magdeburger; R. H. Davies; D. L. Hagmann

[57] ABSTRACT

A cogelled catalyst comprisng a crystalline zeolitic molecular sieve component containing less than 5 weight percent sodium and containing ions selected from Mn, rare earths of atomic numbers 58-71, and alkaline earths Mg, Ca, Sr and Ba, said catalyst further comprising an alumina-containing gel component, a Group VI hydrogenating component and a Group VIII hydrogenating component, and processes using said catalyst.

8 Claims, 2 Drawing Figures

HYDROTREATING CATALYST AND PROCESS

This application is a division of U.S. Application Ser. No. 337,518, filed Mar. 2, 1973 now U.S. Pat. No. 3,954,671, which was a continuation-in-part of U.S. Application Ser. No. 27,068 (now abandoned), filed Apr. 9, 1970.

INTRODUCTION

This invention relates to catalytic hydrocarbon conversion, including catalytic hydrodenitrification and catalytic hydrocracking.

PRIOR ART

It is known that a catalyst may comprise a crystalline zeolitic molecular sieve component associated with other catalyst components. It is also known that at least some of said other catalyst components may be in the form of a matrix in which the molecular sieve component is dispersed. It is also known that such catalysts may be used for such reactions as catalytic cracking, hydrocracking, and hydrodesulfurizaton. Representative prior art patents disclosing one or more of the foregoing matters include:

| | |
|---|---|
| United States Patent | 3,140,251 |
| United States Patent | 3,140,253 |
| British Patent | 1,056,301 |
| French Patent | 1,503,063 |
| French Patent | 1,506,793 |

There has been a continuing search for further improvements in such catalysts, particularly for hydrocracking and hydrofining uses. It is known that the results of catalyst modifications often are largely unpredictable, and the increased number of possible modifications in catalysts containing an additional molecular sieve component does not diminish the unpredictability. A significantly improved result in a test with a modified catalyst containing a molecular sieve component and other catalyst components seldom would have been predictable before the test, particularly in hydrocracking and hydrofining applications of such catalysts, and is a much-desired goal.

OBJECTS

In view of the foregoing, objects of the present invention include providing an improved catalyst comprising a crystalline zeolitic molecular sieve component associated with other catalyst components that has, compared with similar prior art catalysts:
1. high hydrocracking activity,
2. high hydrodenitrification activity, and
3. high stability, i.e., low fouling rate, particularly in hydrodenitrification service.

Further objects of the present invention include provisions of hydrocracking and hydrofining processes, and combinations thereof, using said improved catalyst, that are capable of producing high yields of excellent-quality jet fuel and other valuable fuel products.

The present invention will best be understood, and further objects and advantages thereof will be apparent, from the following description when read in connection with the accompanying drawing.

DRAWING

In the drawing, FIG. 1 is a diagrammatic illustration of apparatus and flow paths suitable for carrying out the process of several of the embodiments of the present invention, wherein the catalyst of the present invention is used on a once-through basis to concurrently hydrocrack and hydrodenitrify a hydrocarbon feedstock to produce more valuable products, some of which may be further upgraded by catalytic reforming or catalytic hydrocracking, if desired.

Figure 2:
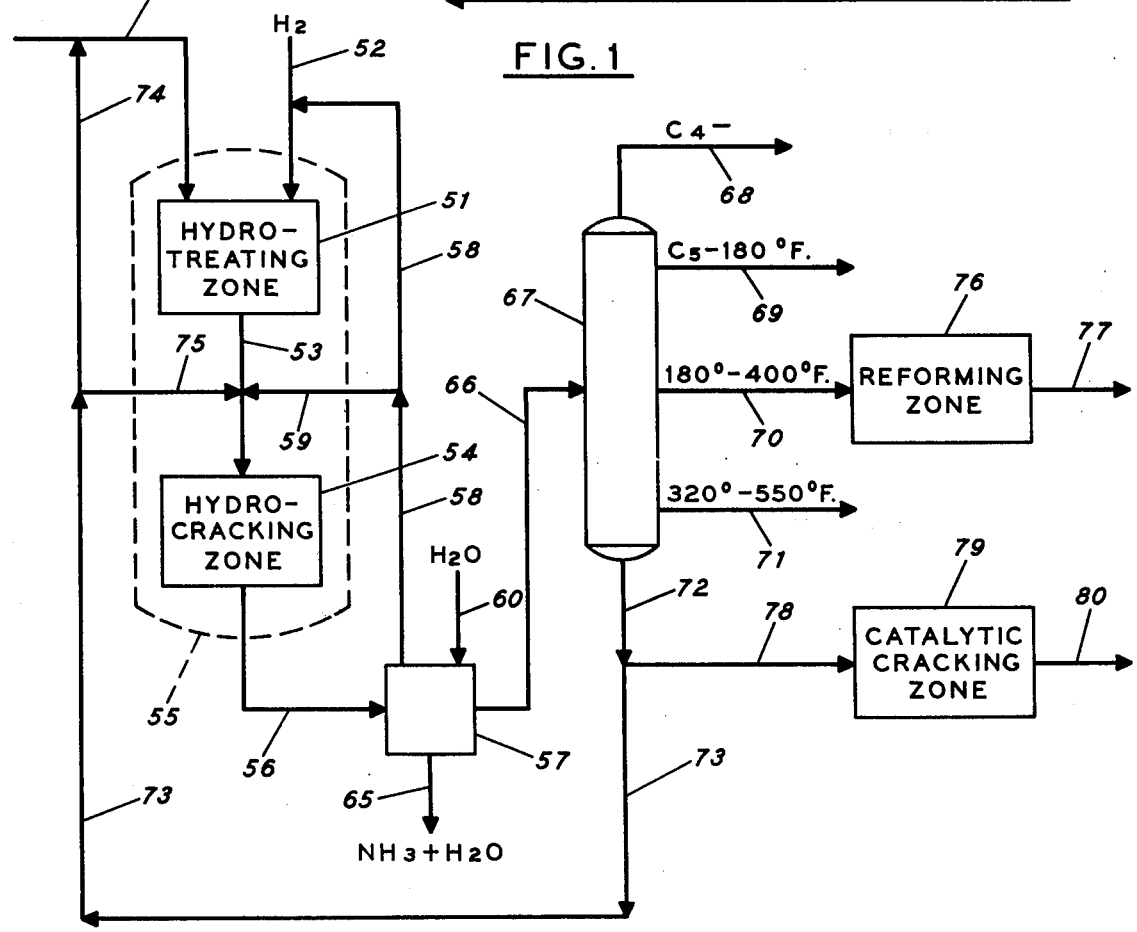

FIG. 2 is a diagrammatic illustration of apparatus and flow paths suitable for carrying out the process of additional embodiments of the present invention, wherein the catalyst of the present invention is used to concurrently hydrofine and hydrocrack a hydrocarbon feedstock, wherein the hydrofining-hydrocracking zone may be operated on a recycle basis, and wherein certain portions of the effluent from the hydrofining-hydrocracking zone may be catalytically reformed or catalytically cracked, as desired.

STATEMENT OF INVENTION

In accordance with the present invention, it has been found that the foregoing objects are achieved by a catalyst containing a unique combination of catalytic components in particular amounts, including alumina, a Group VI component, a Group VIII component, and a crystalline zeolitic molecular sieve component that contains less than 5 weight percent sodium, calculated as metal, and that contains ions selected from Mn, rare earths of atomic numbers 58-71, and alkaline earths Mg, Ca, Sr and Ba.

More particularly, in accordance with the present invention there is provided a catalyst composite comprising:

A. A gel matrix comprising:
  a. less than 15 weight percent silica,
  b. alumina, in an amount providing an alumina-to-silica weight ratio of 50/50 to 100/0, preferably 70/30 to 100/0,
  c. nickel or cobalt, or the combination thereof, in the form of metal, oxide, sulfide or any combination thereof, in an amount of 1 to 10 weight percent, preferably 5 to 9 weight percent, of said matrix, calculated as metal,
  d. molybdenum or tungsten, or the combination thereof, in the form of metal oxide, sulfide or any combination thereof, in an amount of 5 to 30 weight percent, preferably 10 to 25 weight percent, of said matrix, calculated as metal;

B. A crystalline zeolitic molecular sieve containing less than 5 weight percent sodium and containing ions selected from Mn, rare earths of atomic numbers 58-71, and alkaline earths Mg, Ca, Sr and Ba, said sieve further being in particulate form and being dispersed through said matrix;

said catalyst composite being further characterized by an average pore diameter below 100 Angstroms and a surface area above 200 square meters per gram.

Preferably said gel matrix comprises nickel and molybdenum, in the form of the metals, oxides, sulfides or any combination thereof with the alumina/silica or alumina. Said molecular sieve is present in an amount of 1 to 60 weight percent, preferably 10 to 50 weight percent, and more preferably 20 to 40 weight percent of said composite.

The catalyst composite of the present invention is characterized by a bulk density in the range of 0.35 to 0.7 grams per cubic centimeter.

The gel matrix of the catalyst additionally may comprise oxides of titanium, zirconium, thorium, hafnium, or any combination thereof, in an amount of 1 to 10 weight percent, preferably 5 to 9 weight percent of said gel matrix, calculated as metal.

The composition of the gel matrix is based on the entire content of the gel matrix. That is, the weight percents of components (a) through (d) described under A. above are based on the total weight of the gel matrix. For example, the matrix may be composed of a composition such as the following:

14 grams alumina
14 grams silica
50.06 grams $MoS_2$ (30 grams Mo)
15.46 grams NiS (10 grams Ni)
6.48 grams $TiO_2$ (3.88 grams Ti)

This composition then has a weight ratio of alumina-to-silica of 50/50 and the following weight percent distribution:

14% alumina
14% silica
30% Mo or 50.06% $MoS_2$
10% Ni or 15.46% NiS
3.88% Ti or 6.48% $TiO_2$ The crystalline zeolitic molecular sieve component of the catalyst may be in the form of an ultra-stable crystalline zeolitic molecular sieve, that is, one having a sodium content below 3 weight percent, calculated as $Na_2O$, a unit cell size below about 24.65 Angstroms, and a silica/alumina ratio above about 2.15.

Still further in accordance with the present invention, there is provided a hydrotreating process which comprises contacting a hydrocarbon feed containing substantial amounts of materials boiling above 200°F. and selected from the group consisting of petroleum distillates, solvent-deasphalted petroleum residua, shale oils and coal tar distillates, in a reaction zone with hydrogen and the catalyst described above, at hydrotreating conditions including a temperature in the range 400° to 950°F., a pressure in the range 800 to 3500 psig, a liquid hourly space velocity in the range 0.1 to 5.0 and a total hydrogen supply rate of 200 to 20,000 SCF of hydrogen per barrel of feedstock, and recovering hydrotreated products from said reaction zone. The hydrocarbon feed may contain a substantial amount of organic nitrogen, because the catalyst of the present invention is extremely tolerant of organic nitrogen as well as of ammonia, and because the catalyst is an efficient hydrodenitrification catalyst, having high activity and low fouling rate. The catalyst will accomplish hydrodenitrification and hydrocracking concurrently and efficiently. The catalyst may be used as a hydrodenitrification catalyst in a zone preceding a hydrocracking zone containing a similar of different hydrocracking catalyst. A superior jet fuel product may be produced when the catalyst is used for hydrocracking a suitable feedstock. A superior feedstock for a catalytic reformer also may be produced when the catalyst is used for hydrocracking. The hydrocracking zone effluent boiling above the gasoline boiling range, or boiling above the jet fuel boiling range when a jet fuel product is being recovered, may be catalytically cracked to produce additional valuable products.

The crystalline zeolitic molecular sieve component of the catalyst of the present invention contains less than 5 weight percent sodium, and contains ions selected from. Mn, rare earths of atomic numbers 58-71, and alkaline earths Mg, Ca, Sr and Ba. Said ions are polyvalent, non-catalytic ions. Preferably said molecular sieve component contains no other ions except hydrogen ions or ammonium ions, or precursors of hydrogen ions or ammonium ions. In particular, it is preferable that said molecular sieve component be substantially free of any catalytic loading metal or metals, for example the conventional Group VI and Group VIII catalytic metals. By "substantially free of any catalytic loading metal or metals" is meant that the molecular sieve component contains less than 0.5 total weight percent of catalytic metal or metals, based on the sieve, and less than 0.1 weight percent platinum or palladium, based on the sieve. The amount of the desired polyvalent non-catalytic ions present in the molecular sieve component will be from 0.1 to 10 weight percent, based on the sieve.

It will be noted that the weight ratio of catalytic metal in the non-molecular sieve portion of the catalyst to catalytic metal in the molecular sieve portion of the catalyst is high. Certain prior art catalysts achieve a low catalytic metal loading of the molecular sieve component only with a concurrent very low metal content of the non-molecular sieve portion of the catalyst, and it has been found that such catalysts are inferior to the catalyst of the present invention.

Hydrocarbon Feedstocks

The feedstocks supplied to the hydrofining-hydrocracking zone in the process of the present invention are selected from the group consisting of petroleum distillates, solvent-deasphalted petroleum residua, shale oils and coal tar distillates. The feedstocks contain substantial amounts of materials boiling above 200°F., preferably substantial amounts of materials boiling in the range 350°to 950°F., and more preferably in the range 400°to 900°F. Suitable feedstocks include those heavy distillates normally defined as heavy straight-run gas oils and heavy cracked cycle oils, as well as conventional FCC feed and portions thereof. Cracked stocks may be obtained from thermal or catalytic cracking of various stocks, including those obtained from petroleum, gilsonite, shale and coal tar. Because of the superior hydrofining activity and stability of the catalyst of the present invention, the feedstocks need not be subjected to a prior hydrofining treatment before being used in the hydrofining-hydrocracking process of the present invention. Feedstocks may contain as high as several thousand parts per million organic nitrogen, although preferably the organic nitrogen content will be less than 1000 parts per million organic nitrogen. Feedstocks also may contain several weight percent organic sulfur.

Catalyst Comprising a Crystalline Zeolitic Molecular Sieve and Preparation Thereof A. General The crystalline zeolitic molecular sieve component of the hydrofining-hydrocracking catalyst, prior to being loaded with the required polyvalent non-catalytic ions, may be of any type that is known in the art as a useful component of a conventional hydrocracking catalyst containing a crystalline zeolitic molecular sieve component. Especially suitable are faujasite, particularly Y type and X type faujasite, including ultra-stable forms thereof, and mordenite.

B. Method of Preparation

The molecular sieve component of the catalyst may be prepared by any conventional manner known in the art.

The required loading ions may be added to the molecular sieve component of the catalyst by any convenient method, for example impregnation, adsorption or ion exchange. The compound containing the desired ion, used to add the desired ion to the molecular sieve component, may be any convenient compound, for example a chloride or nitrate containing the desired ion. When the molecular sieve component of the catalyst is in the sodium form prior to being loaded with the desired ions, the loading conveniently may be accomplished concurrently with reduction of the sodium content of the molecular sieve component to the required level, by ion exchange.

The molecular sieve component may be dispersed in a matrix of the other catalyst components by cogelation of said other components around said molecular sieve component in a conventional manner.

The molecular sieve component, containing the required polyvalent, non-catalytic ions, may be maintained substantially free of any catalytic loading metal or metals by dispersing the molecular sieve component in a slurry of the precursors of the other catalyst components at a pH of 5 or above.

The cogelled catalyst may be washed and dried in a conventional manner. Drying may be accomplished at a temperature in the range of 100° to 500°F. for a reasonable time, for example 2 to 48 hours. Following drying, the catalyst may be activated by subjecting it to a heat treatment at 850° to 1100°F. for 0.5 to 20 hours. Said heat treatment advantageously may be conducted in the presence of steam, which will tend to enhance the efficacy of the catalyst by enhancing the efficacy of the polyvalent cation-containing molecular sieve component thereof. Particularly when the catalyst comprises an ultra-stable crystalline zeolitic molecular sieve component, it may be subjected, following drying, to a high-temperature thermactivation, at 1200° to 1600°F. for 0.25 to 48 hours, in an oxygen-containing gas stream, which may be air, and which preferably is as dry as practicable.

The finished catalyst may be sulfided in a conventional manner prior to use, if desired. If not presulfided, the catalyst will tend to become sulfided during process operation from any sulfur content that may be present in the hydrocarbon feed.

Operating Conditions

The hydrofining-hydrocracking zone containing the catalyst of the present invention is operated at a temperature in the range 400° to 950°F., preferably 500° to 850°F., a pressure in the range 800 to 3500 psig, preferably 1000 to 3000 psig, a liquid hourly space velocity in the range 0.1 to 5.0, preferably 0.5 to 5.0, and more preferably 0.5 to 3.0. The total hydrogen supply rate (makeup and recycle hydrogen) to said zone is 200 to 20,000 SCF, preferably 2000 to 20,000 SCF of hydrogen per barrel of hydrocarbon feedstock.

The operating conditions in the reforming zone and catalytic cracking zone employed in various embodiments of the present invention are conventional conditions known in the art.

Process Operation with Reference to Drawing

Referring now to FIG. 1 of the drawing, in accordance with one embodiment of the present invention, a hydrocarbon feedstock as previously described, which in this case may boil above 400°F. and which may contain a substantial amount of organic nitrogen compounds, is passed through line 1 into hydrofining-hydrocracking zone 2, which contains the catalyst of the present invention. The feedstock is hydrocracked in hydrocracking zone 2 at conditions previously described, in the presence of hydrogen supplied through line 3. Under these conditions, concurrent hydrodenitrification takes place to the extent that the feedstock is substantially denitrified. The effluent from zone 2 is passed through line 4 to separation zone 5, from which hydrogen separated from the treated feedstock is recycled through line 6 to zone 2. In zone 5, water entering through line 7 is used to scrub ammonia and other contaminants from the incoming hydrocarbon stream, and the ammonia, water and other contaminants are withdrawn from zone 5 through line 8. From zone 5, the scrubbed, hydrocracked materials are passed through line 9 to distillation column 10, where they are separated into fractions, including a $C_4$ - fraction which is withdrawn through line 15, a $C_5$ −180°F. fraction which is withdrawn through line 16, a 180°–400°F. fraction which is withdrawn through line 17, a 320°–550°F. fraction which is withdrawn through line 18, and a 320°F.+ fraction which is withdrawn through line 19. The $C_5$−180°F. fraction withdrawn through line 16 is a superior-quality light gasoline. The 180°–400°F. fraction withdrawn through line 17 is a superior catalytic reforming feedstock, which may be catalytically reformed in reforming zone 20, from which a superior catalytic reformate may be withdrawn through line 25. The 320–550°F. fraction withdrawn through line 18 is a superior-quality jet fuel. The 320°F.+ fraction withdrawn through line 19 is a superior hydrocracking feedstock, which may be catalytically hydrocracked in hydrocracking zone 26 in the presence of a conventional hydrocracking catalyst and in the presence of hydrogen supplied to zone 26 through line 27. From hydrocracking zone 26, an effluent may be withdrawn through line 28, hydrogen may be separated therefrom in separator 29, and hydrogen may be recycled to hydrocracking zone 26 through line 30. Alternatively, said 320°F.+ fraction may be catalytically cracked in a catalytic cracking zone under conventional catalytic cracking conditions. From separator 29, hydrocracked materials may be passed through lines 35 and 9 to distillation column 10, where they may be separated into fractions, as previously described.

Referring now to FIG. 2, a hydrocarbon feedstock as previously described, which in this case may boil above 400°F. and which may contain substantial amounts of organic nitrogen compounds, is passed through line 50 to hydrofining-hydrocracking zone 51, containing the catalyst of the present invention. The feedstock is concurrently hydrofined and hydrocracked in zone 51 at conditions previously described in the presence of hydrogen supplied through line 52. The effluent from zone 51 may be passed through line 53 into hydrocracking zone 54, where it may be hydrocracked under the same conditions as used in zone 51, in the presence of a hydrocracking catalyst. The hydrocracking catalyst in zone 54 may be the same catalyst as used in zone 51, or may be a conventional hydrocracking catalyst comprising a crystalline zeolitic molecular sieve cracking component, in either of which cases the effluent from zone 51 may be passed through line 53 into zone 54 without intervening impurity removal. If the hydrocracking catalyst in zone 54 does not contain a crystalline zeolitic molecular sieve component, it is preferred that interstage removal of ammonia and other impurities be accomplished between zones 51 and 54. Zones 51 and 54 may be located in separate reactor shells, which may be operated at different pressures. Alternatively, zones 51 and 54 may be separate catalyst beds located in a single pressure shell 55, and the effluent from zone 51 may be passed to zone 54 without intervening pressure letdown, condensation or impurity removal, particularly in the case where zone 54 contains the catalyst of the present invention or a conventional catalyst comprising a crystalline zeolitic molecular sieve component. The effluent from zone 54 is passed through line 56 to separation zone 57, from which hydrogen is recycled through line 58 to hydrofining-hydrocracking zone 51. All or a portion of the recycled hydrogen may be passed through line 59 to hydrocracking zone 54, if desired. In separation zone 57, water entering through line 60 is used to scrub ammonia and other contaminants from the incoming hydrocarbon stream, if these contaminants previously have not been removed between zones 51 and 54, and the ammonia, water and other contaminants are withdrawn from zone 57 through line 65. The effluent from zone 57 is passed through line 66 to distillation column 67, where it is separated into fractions, including a $C_4-$ fraction which is withdrawn through line 68, a $C_5-180°F.$ fraction which is withdrawn through line 69, a 180°–400°F. fraction which is withdrawn through line 70, a 320°–550°F. fraction which is withdrawn through line 71, and a 320°F. + fraction which is withdrawn through line 72. The fraction withdrawn through line 72 may be recycled through lines 73 and 74 to hydrofining-hydrocracking zone 51, and this is a preferred manner of operation. All or a portion of the fraction in line 73 may be recycled to hydrocracking zone 54 through line 75, if desired. The $C_5-180°F.$ fraction withdrawn through line 69 is a superior-quality light gasoline. The 180°–400°F. fraction withdrawn through line 70 is a superior catalytic reforming feedstock, which may be catalytically reformed in reforming zone 76, from which a superior catalytic reformate may be withdrawn through line 77. The 320°–550°F. fraction withdrawn through line 71 is a superior-quality jet fuel. All or a portion of the 320°F. + fraction withdrawn through line 72 may be passed through line 78 to catalytic cracking zone 79, where it may be catalytically cracked under conventional catalytic cracking conditions in the presence of a conventional catalytic cracking catalyst to produce valuable fuel products, which may be withdrawn from zone 79 through line 80.

EXAMPLES

The following examples are given for the purpose of further illustrating the catalyst of the present invention, the preparation thereof, and the use thereof in the process of the present invention.

EXAMPLE 1

A cogelled catalyst (Catalyst A, a comparison catalyst) of the following composition is prepared:

| Component | Wt.% of Total Catalyst |
|---|---|
| NiO | 10.5 |
| $MoO_3$ | 37.5 |
| $Al_2O_3$ | 37.5 |
| $SiO_2$ | 14.5 |
| Total | 100.0 |

The catalyst is prepared by the following steps, using sufficient quantities of the various starting materials to produce the above-indicated weight percentages of the components of the final catalyst:

1. An aqueous acidic solution is prepared, containing $AlCl_3$, $NiCl_2$ and acetic acid.
2. Three alkaline solutions are prepared: (1) a sodium silicate solution; (2) an ammonium molybdate solution; and (3) an ammonia solution containing sufficient excess ammonia so that upon combining the alkaline solutions with the acidic solution coprecipitation of all of the metal-containing components of the solutions will occur at a neutral pH of about 7.
3. The acidic and alkaline solutions are combined, and coprecipitation of all of the metal-containing components of the solutions occurs at a pH of about 7, resulting in a slurry.
4. The slurry is filtered to produce a hydrogel filter cake, which is washed repeatedly with dilute ammonium acetate solution, to remove sodium and chloride ionic impurities from the hydrogel.
5. The hydrogel is dried in an air-circulating oven and then is activated in flowing air for 5 hours at 950°F.

The finished catalyst is characterized by a surface area of above 200 $M^2/g.$, an average pore diameter of below 100 Angstroms, and a bulk density of 0.9+ grams of catalyst per cubic centimeter of reactor space occupied by the catalyst.

EXAMPLE 2

A cogelled catalyst (Catalyst B, a comparison catalyst) of the following composition is prepared:

| Component | Wt. % of Total Catalyst |
|---|---|
| NiO | 9.6 |
| $MoO_3$ | 33.7 |
| $Al_2O_3$ | 33.7 |
| $SiO_2$ | 13.0 |
| Crystalline zeolitic molecular sieve, 'Y' form | 10.0 |
| Total | 100.0 |

The catalyst is prepared exactly as in Example 1, using sufficient quantities of the various starting materials to produce the above-indicated weight percentages of the components of the final catalyst. The catalyst contains the same proportions of non-molecular sieve components as the catalyst of Example 1.

The molecular sieve component, in finely divided form, is added to the slurry referred to in Step 3 of Example 1.

The finished catalyst is characterized by a surface area above 200 $M^2/g.$, an average pore diameter below 100 Angstroms, and a bulk density of 0.9 grams of catalyst per cubic centimeter of reactor space occupied by the catalyst.

EXAMPLE 3.

A cogelled catalyst (Catalyst C, a comparison catalyst), of the following composition is prepared exactly as in Example 2:

| Component | Wt.% of Total Catalyst |
|---|---|
| NiO | 8.8 |
| MoO$_3$ | 31.5 |
| Al$_2$O$_3$ | 31.5 |
| SiO$_2$ | 12.2 |
| Crystalline zeolitic molecular sieve, 'Y' form | 16.0 |
| Total | 100.0 |

The finished catalyst contains the same proportions of non-molecular sieve components as the catalyst of Example 1, and is characterized by a surface area above 200 M$^2$/g., an average pore diameter below 100 Angstroms, and a bulk density of 0.77 grams of catalyst per cubic centimeter of reactor space occupied by the catalyst.

EXAMPLES 4–7

Four cogelled catalysts (Catalysts D and E, comparison catalysts, F and G, catalysts according to the present invention) of the following compositions are prepared exactly as in Example 2:

| | Wt. % of Total Catalyst | | | |
|---|---|---|---|---|
| Component | Example 4 Catalyst D | Example 5 Catalyst E | Example 6 Catalyst F | Example 7 Catalyst G |
| NiO | 7.2 | 6.3 | 7.2 | 6.3 |
| MoO$_3$ | 26.3 | 22.5 | 26.3 | 22.5 |
| Al$_2$O$_3$ | 26.3 | 22.5 | 26.3 | 22.5 |
| SiO$_2$ | 10.2 | 8.7 | 10.2 | 8.7 |
| Crystalline zeolitic molecular sieve, 'Y'form | 30.0 | 40.0 | 30.0* | 40.0* |
| Totals | 100.0 | 100.0 | 100.0 | 100.0 |

*Commercially obtainable Linde rare earth-loaded molecular sieve, which has been ion exchanged to load it with a mixture of rare earths, predominantly cerium.

The finished catalysts contain the same proportions of non-molecular sieve components as the catalyst of Example 1, and are characterized by surface areas above 200 M$^2$/g., average pore diameters below 100 Angstroms, and the following bulk densities in grams of catalyst per cubic centimeter of reactor space occupied by the catalysts:

| Catalyst | Bulk density, g./cc. |
|---|---|
| D | 0.65 |
| E | 0.57 |
| F | 0.65 |
| G | 0.57 |

EXAMPLE 8

Portions of Catalysts B-G of Examples 2–7, respectively, are crushed to 16–28 mesh and are separately used to hydrocrack separate portions of a catalytic cycle oil feedstock derived from a California crude oil, on a once-through basis.

The cycle oil feedstock has the following characteristics

| Boiling range, °F. | 500–820 |
|---|---|
| Gravity, °API | 17.2 |
| Organic nitrogen content, ppm | 2500 |

The hydrocracking conditions are:

| Total pressure, psig | 1200 |
|---|---|
| Total hydrogen rate, SCF/bbl. | 5000 |
| Liquid hourly space velocity, V/V/hr. | 1.25 |
| Per-pass conversion to products boiling below 500°F., vol.% | 60 |
| Starting temperature, °F. | As indicated below |

The hydrocracking activities of the three catalysts, as measured by the starting temperatures necessary to achieve the indicated per-pass conversion, are:

| Catalyst | Starting T, °F. |
|---|---|
| B | 777 |
| C | 769 |
| D | 771 |
| E | 772 |
| F | 755 |
| G | 750 |

The 300°–550°F. jet fuel boiling range product in each case is of the same adequate quality, in that in each case the smoke point is 15–20 mm. and the freeze point is below −80°F.

The hydrocracked liquid product in each case is essentially free of organic nitrogen compounds, indicating that essentially complete hydrodenitrification accompanies the hydrocracking in each case.

From this example, in conjunction with Examples 4–7, it appears that: (1) Catalysts F and G, catalysts according to the present invention, have hydrocracking activities higher than those of the comparison catalysts; (2) Catalysts D, E, F and G have lower bulk densities than comparison catalysts A, B and C; and (3) therefore, in the case of Catalysts D, E, F and G, activities comparable to those of the comparison catalysts are obtained with a smaller weight of catalyst.

EXAMPLE 9

Additional portions of Catalysts F and G are separately used to hydrocrack separate additional portions of the feedstocks used in Example 8, at conditions similar to those of Example 8, except on a recycle basis, with extinction recycle of products boiling about 500°F. The recycle operation results in excellent yields of high quality jet fuel.

EXAMPLE 10

The 500°F.+ product from the once-through operation with Catalysts F and G in Example 8 is further processed in a subsequent hydrocracking or catalytic cracking stage. This product is a superior, upgraded feedstock for such subsequent processing.

EXAMPLES 11–17

Additional portions of Catalysts A–G of Examples 1–7, respectively, are crushed to 16–28 mesh and are separately used to hydrodenitrify separate portions of the same catalytic cycle oil used in Example 8.

The hydrodenitrification conditions are:

| | |
|---|---|
| Total pressure, psig | 1200 |
| Total hydrogen rate, SCF/bbl. | 5000 |
| Liquid hourly space velocity, V/V/hr. | 1.25 |
| Product nitrogen, ppm | 1 |

The results are tabulated below, together with the bulk densities of the catalysts:

| Ex. | Catalyst | Catalyst Bulk Density, g./cc. | Catalyst Fouling Rate, °F./hr. | Starting T in °F./hr. (hydrodenitrification activity) | Weight Ratio 320–500°F. product 320°F.- product |
|---|---|---|---|---|---|
| 11 | A | 0.9+ | —¹ | —¹ | —¹ |
| 12 | B | 0.9 | 0.2 | 752 | 2.5 |
| 13 | C | 0.77 | 0.15 | 744 | 3.3 |
| 14 | D | 0.65 | 0.06 | 746 | 3.8 |
| 15 | E | 0.57 | 0.02–0.03 | 747 | 3.5 |
| 16 | F | 0.65 | 0.04² | 725³ | 3.5⁴ |
| 17 | G | 0.57 | 0.04² | 725³ | 3.5⁴ |

¹Catalyst would not accomplish hydrodenitrification at the conditions employed.
²Catalysts F and G, catalysts according to the present invention, have very low fouling rates.
³Catalysts F and G, catalysts according to the present invention, have higher activities than the comparison catalysts, and among the lowest bulk densities; accordingly, the higher indicated activities are obtained with a smaller weight of catalyst than is necessary to obtain the lower activities with the comparison catalysts that have the same or higher bulk densities.
⁴Use of Catalysts F and G, catalysts according to the present invention, results in high weight ratios of 320°–500°F. to 320°F.- products.

Conclusions

Applicant does not intend to be bound by any theory for the unexpectedly superior hydrofining and hydrocracking activity of the catalyst of the present invention. Applicant assumes that the favorable results are largely attributable to, and unique to, the rare earth-loaded molecular sieve component in combination with the particular combination of the other catalytic components used.

What is claimed is:

1. A hydrotreating process which comprises contacting a hydrocarbon feed containing substantial amounts of materials boiling above 200°F. and selected from the group consisting of petroleum distillates, solvent-deasphalted petroleum residua, shale oils and coal tar distillates, in a reaction zone with hydrogen and a catalyst, at hydrotreating conditions including a temperature in the range 400° to 950°F., a pressure in the range 800 to 3500 psig, a liquid hourly space velocity in the range 0.1 to 5.0, and a total hydrogen supply rate of 200 to 20,000 SCF of hydrogen per barrel of feedstock, and recovering hydrotreated products from said reaction zone, said catalyst being a composite comprising
    A. A gel matrix comprising based on the entire content of said gel matrix:
        a. less than 15 weight percent silica,
        b. alumina, in an amount providing an alumina-to-silica weight ratio of 50/50 to 100/0,
        c. nickel or cobalt, or the combination thereof, in the form of metal, oxide, sulfide or any combination thereof, in an amount of 1 to 10 weight percent of said matrix, calculated as metal,
        d. molybdenum or tungsten, or the combination thereof, in the form of metal oxide, sulfide or any combination thereof, in an amount of 5 to 30 weight percent of said matrix, calculated as metal;
    B. A crystalline zeolitic molecular sieve containing less than 5 weight percent sodium and containing ions selected from Mn, rare earths of atomic numbers 58–71, and alkaline earths Mg, Ca, Sr and Ba, said sieve further being in the form of particles, said particles being dispersed through said gel matrix;
    said catalyst having an average pore diameter below 100 Angstroms and a surface area above 200 square meters per gram.

2. A process as in claim 1 further characterized in that said gel matrix comprises nickel and molybdenum, in the form of the metals, oxides, sulfides or any combination thereof.

3. A process as in claim 1 further characterized in that said crystalline zeolitic molecular sieve is present in an amount in the range 1 to 60 weight percent of said composite.

4. A process as in claim 1 further characterized in that said crystalline zeolitic molecular sieve is present in an amount of 10 to 50 weight percent of said composite.

5. A process as in claim 1 further characterized in that said catalyst composite has a bulk density in the range 0.35 to 0.7 grams per cubic centimeter.

6. A process as in claim 1, wherein said hydrocarbon feed contains a substantial amount of organic nitrogen, and wherein ammonia is removed from the effluent from said reaction zone.

7. A process as in claim 1, wherein a gasoline product and a jet fuel product are recovered from the effluent from said reaction zone.

8. A process as in claim 7, wherein a portion of the effluent from said reaction zone boiling above the gasoline boiling range is hydrocracked in a second reaction zone in the presence of hydrogen and a hydrocracking catalyst at hydrocracking conditions including a temperature in the range 400° to 950°F., a pressure in the range 800 to 3500 psig, a liquid hourly space velocity in the range 0.1 to 5.0, and a total hydrogen supply rate of 200 to 20,000 SCF of hydrogen per barrel of feedstock, and wherein at least one hydrocracked product is recovered from said reaction zone.

* * * * *